United States Patent [19]

Hillesheimer

[11] 4,403,680
[45] Sep. 13, 1983

[54] HYDRAULICALLY DRIVEN LIFTING, LOADING OR TIPPING PLATFORM

[76] Inventor: Walter Hillesheimer, Neu-Isenburg, Fed. Rep. of Germany

[21] Appl. No.: 225,433

[22] Filed: Jan. 15, 1981

[30] Foreign Application Priority Data

Nov. 12, 1980 [DE] Fed. Rep. of Germany ....... 3042656

[51] Int. Cl.³ ............................................. B66B 11/04
[52] U.S. Cl. .................................. 187/18; 254/93 R; 177/146
[58] Field of Search ................... 187/8.71, 8.72, 8.41, 187/8.57, 18; 254/3 R, 3 B, 3 C, 89 H, 93 R, 93 L, 122; 177/146, 141, 145; 182/69, 157

[56] References Cited

U.S. PATENT DOCUMENTS 2,848,212 8/1958 Kerridge ............................. 177/146
4,230,196 10/1980 Snead .................................. 177/146

FOREIGN PATENT DOCUMENTS 558173 5/1977 U.S.S.R. ............................. 177/146

Primary Examiner—Joseph J. Rolla
Assistant Examiner—Kenneth Noland
Attorney, Agent, or Firm—Erwin S. Teltscher

[57] ABSTRACT

A hydraulically driven platform lift, loading or tipping platform or the like, having a platform carrying the load and capable of being raised and lowered or tilted by means of at least one hydraulic working cylinder and-depending on the apparatus structure-a lever system, particularly a scissor-type lever system or the like, wherein switching elements for the supply and removal of hydraulic fluid to or from the working cylinder are located in the hydraulic circuit, and the hydraulic working cylinder or cylinders or one of the hydraulic lines connected therewith is connected by a line containing a shut-off or switch-over element, with a measuring device and indicator for determining and indicating the weight of a load resting on the platform.

20 Claims, 4 Drawing Figures ced platform in this manner ena-

HYDRAULICALLY DRIVEN LIFTING, LOADING OR TIPPING PLATFORM

BACKGROUND OF THE INVENTION

The invention relates to a hydraulically driven platform lift, loading or tipping platform or the like, having a platform carrying the load and capable of being raised and lowered or tilted by means of at least one hydraulic working cylinder and—depending on the apparatus structure—a lever system, particularly a scissor-type lever system or the like, wherein switching elements for the supply and removal of hydraulic fluid to or from the working cylinder are disposed in the hydraulic circuit.

Lifting platforms of the type described above serve to elevate loads from a lower level to a higher level, for example to the level of a loading bed of a vehicle in order to enable the vehicle to be loaded more simply and easily. The same is true for unloading vehicles or for transferring a load to a lower level. If the weight of loads to be transported must be determined, this is done in the conventional manner within the framework of a separate operation with the aid of special, separate scales or weighing means. In the absence of such means the weight of the loads is often estimated, which is frequently done with considerable error.

SUMMARY OF THE INVENTION

The object of the invention is to design or equip hydraulically driven lifting, loading or tipping platforms or the like of the type in question in such a way that with their help and within the framework of a loading procedure which is necessary in any event, the weight of the load on the platform of the apparatus can be determined in raising, lowering or rolling the load, and this with an accuracy which can be considered adequate for practical purposes. In this way, a separate and thus inconvenient weighing operation and the apparatus required for this can be dispensed with in many cases.

To attain this object, according to the invention it is proposed to design or equip the platforms in question in such a way that the hydraulic working cylinder or a hydraulic line communicating therewith is connected by a passage containing a shut-off or switching element to a measuring device with indicator showing the weight of a load resting on the platform, wherein the scale of the indicator, being subdivided into units of weight, is set or capable of being set in suc a way that at a predetermined lifting and weighing height and with the platform unloaded the zero point of the scale of the measuring and indicating instrument coincides with the position of the pointer; and that a shut-off element bringing the platform to a standstill at the lifting height predetermined for weighing is located in the hydraulic supply and/or outlet line of the working cylinder.

A platform designed or equipped in this manner enables the weight of a load resting on the platform to be determined and checked more simply and efficiently, and with adequate accuracy, during its transport or the loading operation.

For practical purposes, the weighing of the load on scissor-type lifting platforms or the like takes place at a predetermined platform height, due to the fact that the bars structure of the lever system always assumes the same position, and particularly the same angular position relative to each other, at this level and the pressure prevailing in the hydraulic system with the platform unloaded is always the same. Advantageously, the weighing of the load takes place at a platform height at which the pressure progression curve for the raising or lowering of the platform or the tangent applied thereto assumes as horizontal a position as possible. The weighing of the load can occur during during the elevating or lowering; however, in order to exclude factors possibly affecting the accuracy, the weighing preferably takes place with the hydraulic circuit shut off, in order that a basically exact measurement of the pressure of the hydraulic fluid in the relevant section of the hydraulic circuit can be made, thus also showing a value for the weight of each load to be weighed. The scale of the measuring and indicating instrument is subdivided correspondingly to the weighing position of the lifting platform and can be adjusted in such a way that the weight of each load to be weighed can be read directly from the scale on the basis of the position of the pointer. The same is true for digital indicators. The indicators can be directly mounted in a protected place beneath the platform or at any other suitable place apart from the lifting platform.

Depending on the desired requirements, conventional auxiliary means can be provided for increasing the measuring accuracy or for either increasing or decreasing the pressure of the hydraulic fluid for measuring purposes or the like. It is also possible to provide two or more measuring and indicating instruments intended for different load areas.

For practical purposes, preferably adjustable switching elements are disposed on the bars structure of the lever system, which elements can bring about the standstill of the platform at the desired lifting or weighing height, and if desired, can also actuate the measuring and indicating instrument.

However, in weighing with a lifting platform of the previously known kind, measuring inaccuracies due to friction effects can arise when, for measuring purposes, the platform of the lifting apparatus is brought to a stop from a downward movement. Such inaccuracies occur particularly when bearings and joints of the movable parts are worn from long use, since jamming effects can then occur, thereby altering the hydraulic pressure which is necessary for holding the load and which must be measured to determine the weight.

In order to further improve the hydraulic lifting platform designed or equipped according to the invention, and in particular to obtain even more uniform and exact results in determining the weight of the load on the platform of the lift, and to do so in the shortest possible period of time, wherein the afore-mentioned factors affecting the measuring results should be eliminated as much as possible, it is proposed that compensation means be connected with the hydraulic circuit, the compensation means comprising a hydraulic cylinder with an inner space divided by a piston into two chambers, whereof one chamber is pressurized by the hydrostatic pressure of the hydraulic fluid in the working cylinder or cylinders and the other chamber is acted upon by the pressure of the hydraulic fluid conveyed by the pump until the balanced state is reached.

The invention is based on the concept that the above-mentioned negative influences can be largely eliminated if the measurement is carried out in a condition in which the platform is momentarily in a state of preparedness to leave its position to lift up, and thus virtually "floats" on the hydraulic oil alone, for which reason friction effects falsifying the measured value are largely eliminated.

A further proposal is to dispose a stabilizing chamber between the hydraulic system in which a certain hydrostatic pressure occurs after the closing off of the hydraulic fluid conveyed from the pump to the working cylinder or cylinders, and the measuring means.

BRIEF DESCRIPTION OF THE DRAWINGS

Additional details and features of the platform lift designed according to the invention can be obtained from the dependent claims and the following description.

FIG. 1 shows a side view of a hydraulic scissor-type platform lift designed or equipped according to the invention;

FIGS. 2 and 3 show a schematic view of a hydraulic circuit of the scissor-type platform lift according to FIG. 1;

FIG. 4 shows a side view of a tiltably mounted loading or tipping platform or the like, designed or equipped according to the invention.

DETAILED DESCRIPTION OF THE DRAWINGS

Figure 1:
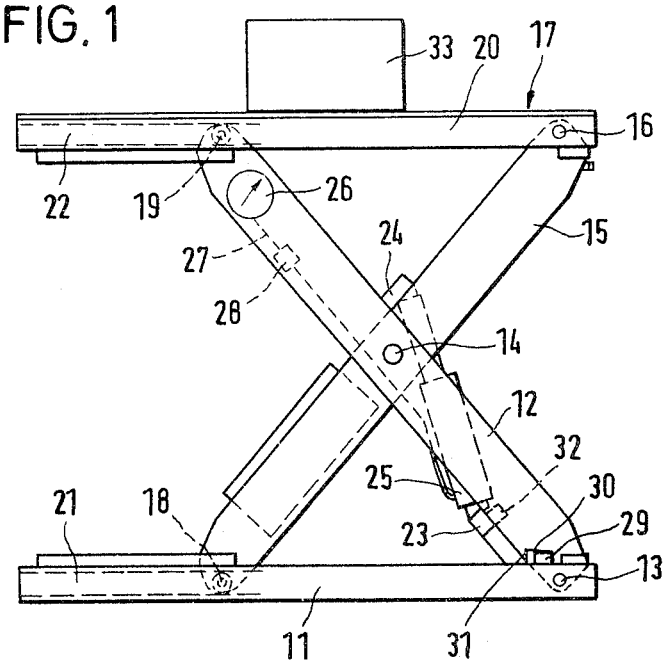
In FIGS. 1 through 4 of the drawings the subject matter of the invention is illustrated on the basis of a preferred embodiment, described in more detail as follows.

The construction of the hydraulic scissor-type platform lift represented by FIG. 1 corresponds to conventional types. Lever arms 12 are mounted on base 11, with their lower ends around shaft 13. The lever arms 15 are pivotally connected with lever arms 12 at approximately the middle by means of a shaft 14, and are attached at the upper ends to shaft 16 of platform 17 carrying the loads. Rollers 18 or 19, located at the lower end of lever arms 15 and the upper end of lever arms 12 fit into guide rails 21 or 22 located on the base 11 and on frame 20 of platform 17, along which rails the lever arms can be moved back and forth. Two hydraulic cylinders 25 are mounted between the crosspiece 23 located on the two lever arms 12 of the platform lift and the crosspiece 24 connecting the two lever arms 15 together, by means of which cylinders the platform 17 can be raised or lowered, wherein the scissor-type lever system comprising the lever arms 12 and 15 and the corresponding connecting means and guide means, provides for a constantly horizontal position of the platform 17.

The measuring and indicating instrument 26 is disposed, for example, on one of the lever arms 12, the instrument being connected by a hydraulic line 27 with the working cylinder 25 containing, for practical purposes, a preferably electromagnetically actuatable stop valve 28. Disposed on base 11 is an electric switch 29, having a switching arm 30 actuated by an adjustable cam 31 on lever arm 12 of the scissor-type lever system, in order to interrupt the supply of hydraulic fluid to the working cylinders 25 with the aid of a valve 32 controlled by the electric switch 29 when a certain angle is reached by the lever arms 12 and 15, and to open valve 28, whereby the measuring and indicating instrument is switched on and is acted upon by the static pressure of the hydraulic fluid in the working cylinders 25, with the result that the weight of the load 33 resting on platform 17 is indicated and can be read.

At the height of the platform 17 at which the load 33 is weighed, the scale of the measuring and indicating instrument 26 is set in such a way that its zero point coincides with the position of the pointer when platform 17 of the platform lift is in this position. The indexing of the scale for this position is such that the weight of any load 33 can read off directly from the scale.

Figure 2:
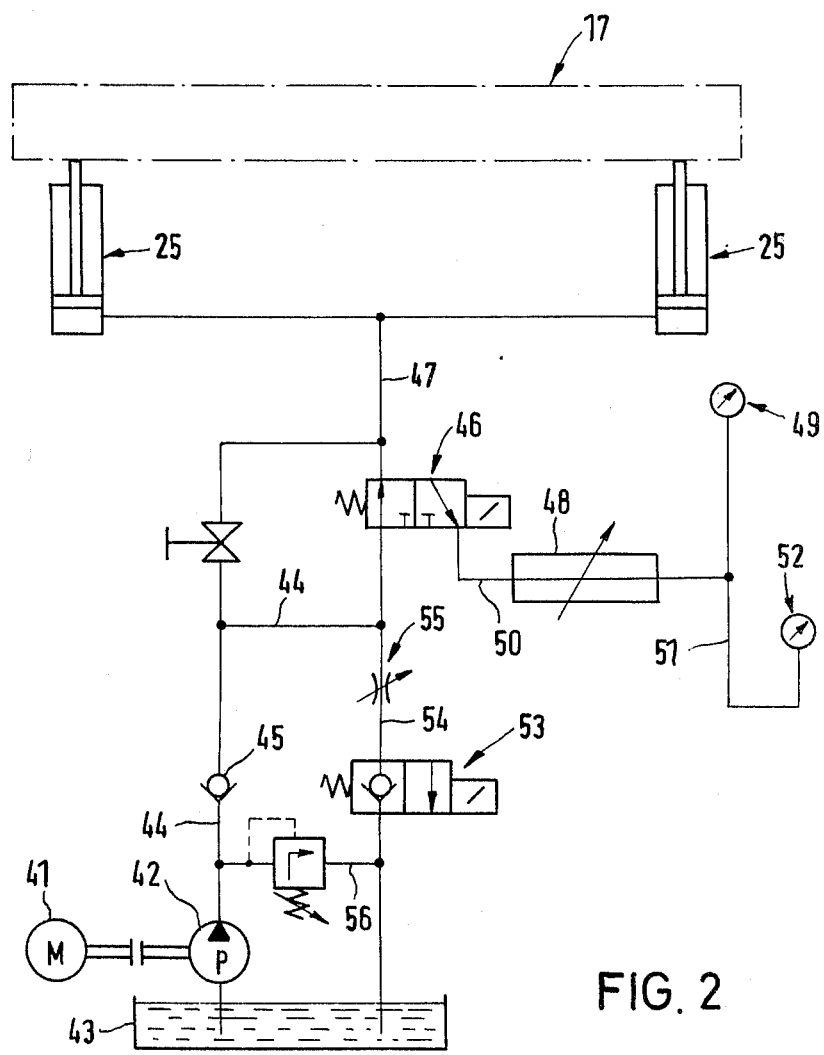

As seen in FIG. 2, the pump 42 driven by motor 41 conveys fluid drawn from a reservoir 43 under pressure through line 44, in which a nonreturn valve 45 and a shut-off and control valve 46 are located, into the working cylinders 25 of the platform lift. The pistons moved by the hydraulic fluid and contained in the working cylinders bring about a raising of platform 17 of the platform lift. When a pre-determined lifting height of platform 17 is reached, conveyor line 44 is automatically shut off by valve 46. The hydraulic fluid line 47 can be connected with the measuring means 48 and the indicator 49 through line 50 by means of the shut-off and control valve 46. An additional indicator 52 can be connected with the measuring means 48 by line 51 if necessary.

After the weight of the load resting on platform 17 has been determined, valve 46 is re-opened so as to push platform 17 to the desired final height. When this height is reached, valve 46 is closed in order to hold platform 17 at the level attained. To lower platform 17 valve 46 and the shut-off element 53 in connecting line 54 between valve 46 and the fluid reservoir 43, with the connecting line 54 also containing the adjustable throttle means 55, are opened. With conveyor line 44 closed, the hydraulic fluid transferred by the pump 42 is fed back into the fluid reservoir 43 by way of connecting line 56 between conveyor line 44 and return line 55.

The arrangement according to FIG. 3 largely corresponds with that of FIG. 2; however, it contains several elements enhancing the measuring accuracy, as described in more detail below.

Figure 3:
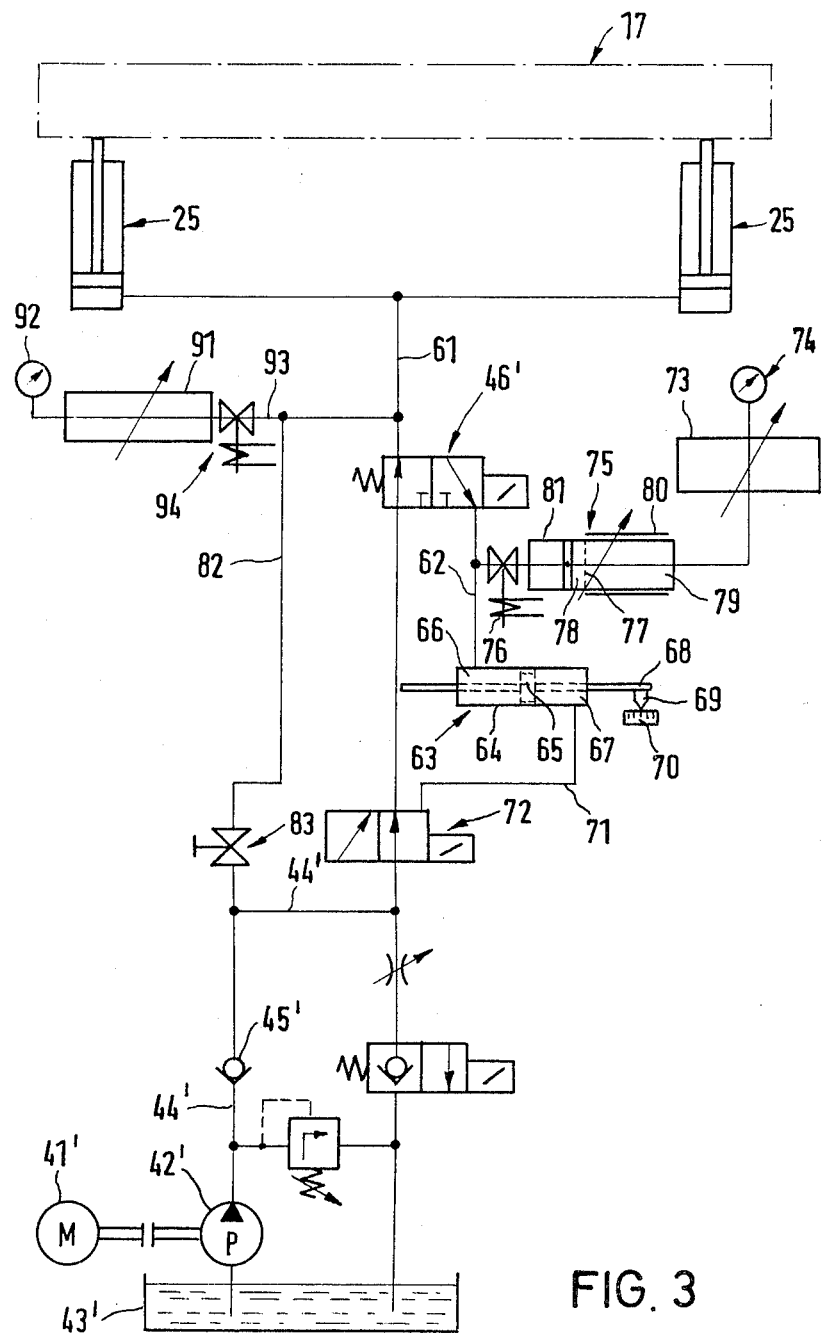

As shown in FIG. 3, after line 44' is closed, the shut-off and reversing valve 46' connects line 61 leading to working cylinders 25 with a compensating means 63 by way of line 62. This compensating means preferably comprises a hydraulic cylinder 64 containing a piston 65, which divides the interior of the cylinder 64 into a first chamber 66 and a second chamber 67. The piston 65 is connected to a continuous piston rod 68 projecting through the cylinder ends, with a trip cam 69 capable of actuating a switching means 70 being located at one end of the piston rod. Connecting line 62 between the shut-off and reversing valve 46' and compensating means 63 opens into the first cylinder chamber 66 of compensating means 63. A line 71 opening into the second cylinder chamber 67 is connected across shut-off and reversing valve 72 with conveyor line 44'. It is favorable to arrange a throttle means (not shown) in passage 71, thus guaranteeing a soft mode of operation for the compensating means 63. The connecting passage 62 has a branch line from which the hydraulic pressure used to determine the weight is taken.

Between the above-mentioned branch at the connecting passage 62, and measuring means 73 with indicator 74 and if necessary a delaying element connected therebefore, a stabilizing chamber 75 is located, in whose feed line another electromagnetically actuatable shut-off valve 76 is preferably located. The interior of the stabilizing chamber 75 is divided by membrane 77 into two subchambers 78, 79. In order to keep the hydraulic fluid in the stabilizing chamber at an ever-constant temperature level, the stabilizing chamber is enclosed by a heating jacket 80. The stabilizing chamber 75 is provided to eliminate, or at least reduce, swirls and other disturbance factors. A chamber 81 containing damping elements is arranged before the stabilizing chamber.

In order to determine the weight, valve 46' is switched. Passage 61 is thereby shut off from the feed line 44', and connecting line 62 and the first cylinder chamber 66 of compensating means 63 are subjected through line 61 to the pressure present in the working cylinders 25. Piston 65 in cylinder 64 is thereby moved to the right. Valve 72, controlled by trip cam 69, is then switched and thus hydraulic fluid is fed from pressure line 44' through connecting line 71 into the second cylinder chamber 67 for as long as is necessary for piston 65 to reach its center position again. Trip cam 69 then switches off the pump 42'. Due to pump 42' not immediately ceasing to operate, the pump 42' can also be switched off shortly before the center position of piston 65 is reached. By means of the return movement of piston 65 a small amount of hydraulic fluid is forced back from the first cylinder chamber 66 of cylinder 64 of compensating means 63, toward working cylinder 25, whereby the frictional work in the platform lift joints is largely compensated; that is, the platform is put into the previously mentioned "floating" state. The compensating means 63 works in the same way as a hydraulic scales.

At the moment in which a state of balance is created in the compensating means 63, valve 76, controlled by trip cam 69 and located in the connecting line leading to stabilizing chamber 75 or to the damping chamber 81 connected upstream of the stabilizing chamber 75 if necessary, is opened. The measurement then takes place. The measurement can be delayed if necessary by a lag device, in order that the measurement not be carried out until the hydraulic fluid in the measuring circuit has calmed down for a certain length of time after the opening of the shut-off valve 76.

The compensating means does not necessarily have to comprise a cylinder with a subdivided inner space; it can have any other suitable form.

Advantageously, a means is located in the hydraulic circuit, whereby a slight lowering of the platform 17 upon its having been stopped is made possible, before the compensating means 63 is switched on. Thus possible factors are also eliminated which negatively influence the measuring results and which are determined by the direction from which the platform is moved to the measuring height.

After completion of the weighing of the load resting on platform 17, valves 46' and 72 are re-opened by an external control command in order to bring platform 17 to the desired final height, i.e. to further raise or lower it.

A further increase in the measuring accuracy can be achieved if the hydraulic oil in the hydraulic circuit is circulated for a pre-determined period of time before operation of the platform lift, for which purpose a second line 82 reaching almost to the working cylinders and capable of being closed by valve 83 is provided.

Furthermore a measuring device 91 with indicator 92, connected with the hydraulic system by connecting line 93, can be additionally provided. This line 93 can be closed by an electromagnetic valve 94, which is preferably only opened at the moment at which a measurement is to take place thus deactivating the measurement means 19, when valve 94 is closed. Thus measuring means can be used for roughly determining the existing hydraulic pressure or also—upon consideration of other criteria—for rough determination of the weight of the load on the platform. The indicator 92 may be selected to indicate a load range different from that of the indicator 74.

Figure 4:
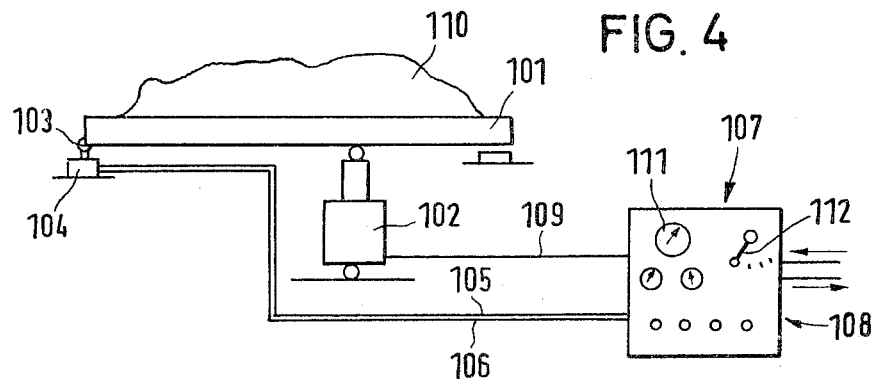

FIG. 4 refers to a loading or tipping platform or the like, which may be inclined at an angle to the horizontal, and the platform 101 which is pivotable around the horizontal tilt shaft 103 by means of the working cylinder 102. The tilt shaft 103 is supported by at least one hydraulic cylinder 104 and is connected by hydraulic lines 105, 106 to a switching and measuring means 107 contained in switch cabinet 108. The measuring means 107 is also connected to the hydraulic line 109 leading to working cylinder 102, in order to determine the weight of the load 110 on platform 101 and to indicate this by means of indicator 111. With the aid of the switch lever 112, platform 101 with load 110 can be raised, the load weighed and the platform lowered again or brought to any desired inclined position.

As mentioned above, hydraulically driven lifting, loading or tilting platforms of the most varied constructions can be designed or equipped in the manner according to the invention. However, it is also possible to provide this with reference to loading gates of motor vehicles, which may be inclined to the horizontal, which loading gates are movable by means of at least two hydraulic cylinders mounted thereupon, in order that vehicles may be loaded and unloaded by this means. For purposes of weighing these loads the two hydraulic cylinders are connected by lines provided with a shut-off valve, to a measuring means with an indicator, wherein the arrangement has all essential elements enabling a rapid weighing.

In practical testing the platform lift according to the invention has shown excellent results within the framework of the given purpose. The weight of the load in question can be determined during loading operations without a special work process, to be used either as weight information for further transport or for control purposes.

In addition, the subject matter of the invention also has a safety function in that the weight of a load, having been determined with sufficient accuracy, provides a basis for the use of lifting apparatus and transport equipment during the further handling of the load, so that endangering equipment and personnel by overloading and damaging is avaoidable. This is particularly true of bulky goods such as in the manufacture of machines and other apparatus, where scales for over 100 kg are often hardly present at all and even the transport to the platform lift is hazardous.

What is claimed is:
1. A hydraulically-operable platform-movng device, comprising in combination:
a platform adapted to hold a load,
moving means for moving said platform at least between a first position, and a second position at least partly elevated with respect to said first position, and wherein friction effects occur when said platform is moved, and the accuracy of the weight of the load resting on the platform may be impaired by said friction effects,
hydraulic cyliner-piston drive means for driving said moving means, being adapted to be energized by energizing means, said energizing means including a pump exerting pressure on at least a portion of said fluid, said hydraulic cylinder piston-drive means having a predetermined hydrostatic pressure prevailing therein, and including a hydraulic circuit, hydraulically operable measuring means for determining the weight of the load resting on the platform, indicating means connected to said measuring means, and including a scale subdivided into units of weight for indicating the weight on the load on said scale, and having a zero point, and a pointer settable so that said pointer coincides with said zero point at a predetermined position of said platform, when said platform is free of any load, a hydraulic line connecting said hydraulic circuit to said measuring means, switching means disposed in said hydraulic circuit, and adapted to operatively control, supply, and remove hydraulic fluid to, and from said hydraulic circuit, respectively, and including a first valve disposed in said hydraulic line for controlling the hydraulic fluid flow between said hydraulic circuit and said measuring means, and a second valve for shutting off the supply of the hydraulic fluid to said drive means upon said platform attaining said predetermined position, and compensating means connected to said hydraulic circuit to counteract said friction effects, and including a hydraulic cylinder formed with an inner space, and a piston movable within said inner space and dividing said inner space into two chambers, one of said chambers being subjected to said hydrostatic pressure, the other of said chambers being subject to said pump pressure, whereby said friction effects are substantially counteracted upon said hydrostatic pressure equalling said pump pressure, so as to reach a state of balance in said hydraulic cylinder.

2. A platform-moving device as claimed in claim 1, wherein
said platform is normally in a horizontal position, and including tilting means for tilting said platform between an inclined position and said horizontal position.

3. A platform-moving device as claimed in claim 2, wherein
said tilting means include a shaft, and wherein said platform is pivotable around said shaft, and wherein said first valve is controllable so as to deactivate said measuring means.

4. A platform-moving device as claimed in claim 1 or claim 2 adapted to be used on a motor vehicle, and wherein said hydraulic cylinder-piston drive means include at least two hydraulic cylinders.

5. A platform-moving device as claimed in claim 1, wherein
said moving means includes a lever mechanism, and wherein said predetermined position is the position at which the load is weighed.

6. A platform-moving device as claimed in claim 5, wherein
said switching means includes adjustable switch means disposed on said lever mechanism for halting the movement of said platform.

7. A platform-moving device as claimed in claim 6, wherein
said adjustable switch means are arranged to deactivate the operation of said measuring means.

8. A platform-moving device as claimed in claim 1, wherein
said cylinder has two end covers disposed on opposite sides of said cylinder, and wherein said piston includes a piston rod passing through said covers, said piston rod being arranged to actuate at least some of said switching means.

9. A platform-moving device as claimed in claim 8, wherein swirls and other disturbing factors may occur in the hydraulic fluid operatively present in said hydraulic circuit, and further comprising stabilizing means to eliminate, or at least reduce the influence of said swirls and disturbing factors on said hydraulic fluid when the weight of the load resting on said platform is determined, and including a stabilizing chamber connected to said measurement means, and valve means disposed upstream of said stabilizing means normally allowing fluid passage between said pump and said cylinder-piston drive means, and arranged to shut off said fluid passage for operative activation of said stabilizing means.

10. A platform-moving device as claimed in claim 9, further comprising chamber-dividing means dividing said stabilizing chamber into two subchambers.

11. A platform-moving means as claimed in claim 10, wherein said chamber-dividing means is a membrane.

12. A platform-moving means as claimed in claim 10, wherein said chamber-dividing means includes a second piston freely movable in said stabilizing chamber.

13. A platform-moving means as claimed in claim 10, wherein
said hydraulic line is a first line, and further comprising a second hydraulic line connecting said stabilizing means to said valve means, and wherein said chamber-dividing means is located in the vicinity of said connecting line.

14. A platform-moving device as claimed in claim 9, further comprising a heating jacket at least partially surrounding said stabilizing chamber.

15. A platform-moving device as claimed in claim 9, further comprising a damping chamber disposed upstream of said stabilizing chamber.

16. A platform-moving device as claimed in claim 9, wherein
said compensating means is disposed upstream of said stabilizing means.

17. A platform-moving device as claimed in claim 8, wherein said at least some of said switching means include a third valve having a controllable opening, and being disposed upstream of said cylinder-piston drive means, and switch means to activate said compensating means, whereby, upon said platform being moved to a desired position, and prior to activation of said compensating means, said third valve is openable for a predetermined time so as to slightly lower said platform from said desired position.

18. A platform-moving device as claimed in claim 1, wherein
said switching means include a third valve having a controllable opening, and being disposed in said hydraulic circuit upstream of said cylinder-piston drive means, whereby, upon said platform being moved to a desired position, said third valve is openable for a predetermined time so as to slightly lower said platform from said desired position.

19. A platform-moving device as claimed in claim 1, further comprising delay means having a predetermined delay, and being disposed upstream of said measuring means for activating said measuring means following said predetermined delay upon said platform attaining said predetermined position.

20. A platform-moving device as claimed in claim 1, wherein
said indicating means include a plurality of indicators for different respective weight ranges of the load.

* * * * *